US006441618B2

(12) United States Patent
Rossi et al.

(10) Patent No.: US 6,441,618 B2
(45) Date of Patent: Aug. 27, 2002

(54) METHOD AND APPARATUS FOR MONITORING THE ADVANCE OF SEAWATER INTO FRESH WATER AQUIFERS NEAR COASTAL CITIES

(75) Inventors: David J. Rossi, Katy; Willem A. Wijnberg, Houston; Peter V. Howard, Belleville, all of TX (US); Jean-Pierre R. Delhomme, Boulogne-Billancourt; Kamal Babour, Bures sur Yvette, both of (FR)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/772,039

(22) Filed: Jan. 29, 2001

Related U.S. Application Data

(60) Provisional application No. 60/180,572, filed on Feb. 4, 2000, and provisional application No. 60/180,981, filed on Feb. 8, 2000.

(51) Int. Cl.$^7$ .......................... G01V 3/02; G01R 27/00
(52) U.S. Cl. .................. 324/357; 324/324; 324/674
(58) Field of Search ................... 324/324, 325, 324/354, 357, 691, 694, 697; 166/250.01; 73/152.01, 152.18, 304 R

(56) References Cited

U.S. PATENT DOCUMENTS

| | | | |
|---|---|---|---|
| 4,169,377 A | * | 10/1979 | Scheib ..................... 73/304 R |
| 4,875,015 A | | 10/1989 | Ward |
| 5,325,918 A | | 7/1994 | Berryman et al. |
| 5,346,307 A | | 9/1994 | Ramirez et al. |
| 5,642,051 A | | 6/1997 | Babour et al. |
| 5,661,406 A | | 8/1997 | Daily et al. |
| 5,825,188 A | | 10/1998 | Montgomery et al. |

FOREIGN PATENT DOCUMENTS

| | | |
|---|---|---|
| EP | 0 656 547 A1 | 6/1995 |
| WO | WO 98/45574 | 10/1998 |

OTHER PUBLICATIONS

"Monitoring of Seawater Intrusion in Coastal Aquifers: Basics and Local Concerns" by A.J. Melloul et al., Journal of Environmental Management, 1997, 51, 73–86.
"Electrode Arrays for Measuring Groundwater Flow Direction and Velocity", by P.A. White, Geophysics, vol. 59, No. 2, Feb. 1994, pp. 192–201.
"Use of Electrical and Electromagnetic Techniques to map Seawater intrusion Near the Cross Florida Barge Canal", by S.E. kruse et al., Environmental and Engineering Geoscience, vol. IV, No. 3, Fall 1998, pp. 331–340.
"A Strategy for Monitoring the Salt–Water Interface" by Lynn Yuhr et al., Hydrology and Hydrogeology in the '90s, American Institute of Hydrology, 1991, pp. 320–333.

* cited by examiner

*Primary Examiner*—Walter E. Snow
(74) *Attorney, Agent, or Firm*—John H. Bouchard

(57) ABSTRACT

Sensors are permanently placed in the ground near observation and injection wells in order to passively and continuously monitor the status of seawater advance toward fresh water aquifers near coastal cities as well as the status of fresh water injected into the injection wells. Such sensor devices are installed in the ground and electrically connected to surface acquisition equipment that would, without human intervention, transmit acquired data to a centralized facility for processing and interpretation. Various types of sensors can be used: the sensors used for general reservoir monitoring and/or the sensors used for leak detection, soil heating, and temperature mapping. Alternatively, a special type of sensor can be designed and provided for the purpose of monitoring the status of seawater advance toward fresh water aquifers.

20 Claims, 7 Drawing Sheets

METHOD AND APPARATUS FOR MONITORING THE ADVANCE OF SEAWATER INTO FRESH WATER AQUIFERS NEAR COASTAL CITIES

CROSS REFERENCE TO RELATED APPLICATIONS

This is a utility application of prior provisional application Ser. No. 60/180,572 filed Feb. 4, 2000 entitled "Seawater Barrier Monitoring", and of prior provisional application Ser. No. 60/180,981 filed Feb. 8, 2000 entitled "Water Aquifer Electrical Monitoring Electrode Cable System".

BACKGROUND OF THE INVENTION

The subject matter of the present invention relates to a method and apparatus for passively and continuously monitoring the status of seawater advance toward water acquifers near coastal cities by placing sensors, such as a particular type of electrode cable system, in the ground near observation and injection wells, transmitting acquired data back to centralized processing facilities, and, responsive thereto, subsequently mitigating the advance of the seawater into potable water acquifers which are situated near the coastal cities.

Coastal cities rely on groundwater from subsurface aquifers to meet all or part of their municipal water needs. In cases of historical overdraft, water is withdrawn from the subsurface aquifers at a rate exceeding the rate of natural aquifer recharge. As illustrated in FIG. 1, such overdraft results in a lowering of the water table in the aquifers and is accompanied by possible intrusion of seawater into the aquifer. The breakthrough of seawater at wells supplying the drinking water has severe long term consequences on municipal potable water deliverability. For example, Los Angeles (LA) experienced such overdraft in the first half of the twentieth century (the 1900s). As a result, LA subsequently created the Water Replenishment District (WRD) agency to define and enforce reduced aquifer pumping rates and mitigate the effects of seawater intrusion.

Various means exist to mitigate seawater advance. One of these methods is to recharge the aquifers from surface spreading grounds. Another method involves injecting inert gas or fresh water into the ground using special injection wells, as illustrated in FIG. 2. The water injection method consists of injecting fresh water into the aquifer, forming a fresh water 'mound' in the local area around the well, to create a zone with pressure above the pressure in the seawater, thereby mitigating the landward advance of the seawater. As an example, since the 1950s, Los Angeles has constructed approximately 250 seawater barrier injection wells of this type thereby resulting in three lines of injectors. These three different lines of injectors are illustrated in FIG. 3, where the position of the water injection wells is shown by the adjacently connected circles.

In addition to the wells constructed for water injection (i.e., injection wells) as shown in FIGS. 2 and 3, a number of observation or monitoring wells (i.e., observation wells) are typically constructed in the vicinity of the injection wells. These observation wells are used to periodically measure the pressure (i.e., the hydraulic head) of the aquifer in the neighborhood of the injection wells, and for occasional sampling of water chloride (i.e., salinity) levels. This gives information about how efficiently the injection wells are limiting the seawater advance. In Los Angeles, for example, over 700 observation wells have been constructed along the three lines of injection wells (shown in FIG. 3) in order to monitor the position of the seawater wedge. In a typical municipal setting with seawater advance into the aquifers, the water authorities sample the chloride concentrations at three positions (top, middle, and bottom) of each water sand unit, as illustrated in FIG. 7. This provides information about how efficiently the injection wells are limiting the seawater advance in each sand unit.

However, a need exists to passively and continuously monitor, in the observation wells, the status of the seawater wedge and the resultant seawater advance toward coastal city water aquifers as well as the status of the injected fresh water in the injection wells.

Depending on the application, various types of in-situ sensors have been employed in the oil industry for general reservoir monitoring. See the following "first reference" which discloses general reservoir monitoring: Babour, K. A., Belani and J. Pilla, 'Method and Apparatus for Surveying and Monitoring a Reservoir Penetrated by a Well Including Fixing Electrodes Hydraulically Isolated within a Well', U.S. Pat. No. 5,642,051, the disclosure of which is incorporated by reference into the specification of this application. In addition, such sensors have been proposed for leak detection, soil heating and temperature mapping. See the following three "second set of references" which disclose leak detection, soil heating, and temperature mapping: (1) Berryman, James G., Daily, William D., 'Optimal joule heating of the subsurface, U.S. Pat. No. 5,325,918, the disclosure of which is incorporated by reference into the specification of this application, (2) Daily, William D., Laine, Daren L., Laine, Edwin F., 'Methods for Detecting and Locating Leaks in Containment Facilities using Electrical Potential Data and Electrical Resistance Tomographic Imaging Techniques', U.S. Pat. No. 5,661,406, the disclosure of which is incorporated by reference into the specification of this application, and (3) Ramirez, Abelardo L.; Dwayne A.; Daily, William D., 'Using Electrical Resistance Tomography to Map Subsurface Temperatures', U.S. Pat. No. 5,346,307, the disclosure of which is incorporated by reference into the specification of this application.

Consequently, in connection with the aforementioned need to passively and continuously monitor, in the injection wells and the observation wells, the status of the seawater wedge and the resultant seawater advance in addition to the status of the injected fresh water, there is a further need to utilize 'special sensors' in the injection wells and in the observation wells to perform the step of monitoring the seawater advance and the status of the injected fresh water. These 'special sensors' can be the sensors disclosed above in connection with the "first reference" or in connection with the "second set of references". Alternatively, these 'special sensors' can be new sensors which are adapted for the above stated purpose of monitoring the seawater advance and the status of the injected fresh water.

SUMMARY OF THE INVENTION

Accordingly, it is a primary object of the present invention to passively and continuously monitor, in the observation wells, the status of the seawater wedge and the resultant seawater advance toward fresh water aquifers located near coastal cities in addition to the status of any fresh water injected into the injection wells.

Accordingly, it is a primary aspect of the present invention to permanently install sensors in the ground in or around an observation well located near the injection wells in order to passively and continuously monitor the status of the seawater advance toward fresh water aquifers near coastal cities in addition to the status of the fresh water injected into the injection wells (hereinafter, the 'monitoring step').

It is a further aspect of the present invention to implement the aforementioned 'monitoring step' by utilizing sensors which have been used in the oil industry, such as the sensors used for general reservoir monitoring, and/or the sensors used for leak detection, soil heating, and temperature mapping.

It is a further aspect of the present invention to implement the aforementioned 'monitoring step' by utilizing sensors that are specially designed for use during the steps of monitoring the seawater advance toward fresh water aquifers near coastal cities and monitoring the status of fresh water injected into the injection wells.

It is a further aspect of the present invention to use oilfield related techniques/methods [that are currently being used in the oil industry to detect and record the existance of underground deposits of hydrocarbon (such as oil)] for the purpose of: (1) detecting the advance of seawater toward fresh water aquifers near coastal cities, and (2) detecting the pressure in the 'mound' of fresh water that has been injected into injection wells, the purpose of which is to create a zone of pressure above the pressure in the seawater for mitigating (i.e., slowing) the landward advance of the seawater toward the fresh water aquifers that are situated near the coastal cities.

It is a further aspect of the present invention to install a resistivity array around a casing of an observation well, or inside the casing of the observation well, which is located near an injection well, for the purpose of measuring the conductivity and resistivity of the earth formation within or around the observation well, the conductivity and resistivity values being representative of the presence or absence of either seawater or fresh water within or near the observation well, the conductivity and resistivity values being further representative of the location of a seawater/fresh water boundary within or near the observation well, the boundary being further representative of the advance of the seawater toward fresh water aquifers near coastal cities.

It is a further aspect of the present invention to install a resistivity array within or around an observation well for the purpose of measuring for and determining the presence or absence of a seawater/fresh water boundary in a water sand unit located adjacent to the observation well, the resistivity array having a top subarray portion, a middle subarray portion, and a bottom subarray portion for measuring and determining the conductivity and resistivity of a top part, a middle part, and a bottom part of the water sand unit thereby determining the location of said seawater/fresh water boundary.

It is a further aspect of the present invention to install a resistivity array around an observation well for the purpose of measuring for and determining the presence or absence of a seawater/fresh water boundary in a water sand unit located adjacent to the observation well, the resistivity array including a plurality of subarrays located adjacent the top part and the middle part and the bottom part of the water sand unit, each subarray of the resistivity array including a plurality of electrodes, a first pair of the electrodes generating and receiving current, a second pair of the electrodes used to measure the resulting potential difference, the current and the potential difference being used to calculate the resistivity of the water sand unit, the resistivity being indicative of the presence or absence of seawater in the water sand unit near the observation well.

It is a further aspect of the present invention to install a resistivity array around an observation well for the purpose of measuring for and determining the presence or absence of a seawater/fresh water boundary in a water sand unit located adjacent to the observation well, wherein the electrodes which comprise each subarray of the resistivity array are spaced apart from each other by a distance, said distance being chosen such that a particular resolution is achieved, a distance of "d" between electrodes achieving one resolution, the distance "3d" achieving still another resolution, and the distances "6d" and "9d" achieving still another resolution. The larger the distance between the electrodes, the deeper into the earth formation the electrical current will flow, and the deeper the depth of investigation on sensitivity. Electrodes spaced at distances "6d" and "9d" are sensitive to a seawater/freshwater boundary situated away from the well containing the permanently installed electrode array. This allows the presence of seawater to be determined before it arrives in physical contact with the monitoring electrode array.

It is a further aspect of the present invention to install a resistivity array around an observation well for the purpose of measuring for and determining the presence or absence of a seawater/fresh water boundary in a water sand unit located adjacent to the observation well, wherein each resistivity subarray could comprise a distinct unit comprised of an insulating material (such as plastic or ceramic) having interleaved integral electrodes, or the resistivity subarray could comprise a set of solid plated metal electrodes wrapped around a cable.

It is a further aspect of the present invention to install a resistivity array around an observation well for the purpose of measuring for and determining the presence or absence of a seawater/fresh water boundary in a water sand unit located adjacent to the observation well, wherein a plurality of isolated additional electrodes are used in combination with the resistivity array in order to monitor a free water level inside the observation well.

It is a further aspect of the present invention to install a resistivity array around an observation well for the purpose of measuring for and determining the presence or absence of a seawater/fresh water boundary in a water sand unit located adjacent to the observation well, where each subarray of the resistivity array that is located adjacent the top part and the middle part and the bottom part of the water sand unit comprises a quadrapole electrode set, one quadrapole electrode set being located adjacent the top part, another quadrapole electrode set being located adjacent the middle part, and another quadrapole electrode set being located adjacent the bottom part of the water sand unit.

In accordance with the above object and aspects of the present invention, sensors are permanently placed in the ground near observation and injection wells in order to passively and continuously monitor the status of seawater advance toward fresh water aquifers near coastal cities as well as the status of fresh water injected into the injection wells. Such sensor devices are installed in the ground and electrically connected to surface acquisition equipment that would, without human intervention, transmit acquired data to a centralized facility for processing and interpretation. This would avoid the process of manual data collection and provide more frequent and timely data for better control of water injection. Various types of sensors can be used: the sensors used for general reservoir monitoring that are disclosed in the 'first reference' cited above, and/or the sensors used for leak detection, soil heating, and temperature mapping that are disclosed in the 'second set of references' cited above. Alternatively, a special type of sensor can be designed and provided for the purpose of monitoring the status of seawater advance toward fresh water aquifers.

An array of such sensors (hereinafter called a "resistivity array") is installed in the Earth along the exterior of the injection or observation well casings, or such sensors can be placed inside the well. Then, time-lapse in-situ electrical resistivity measurements are carried out. A basic quadrapole measurement consists of injecting and withdrawing current (I) between two outer electrodes of a group of four electrodes, and measuring the voltage potential (V) between the two inner electrodes. The resistivity of the Earth in the vicinity of the quadrapole sensors is computed from the current "I" and the potential "V". Thus, the electrode quadrapoles may be used to obtain resistivity measurements at one or more depths in the water bearing sands in the earth. Consequently, each single formation or water resistivity measurement may be used to discriminate between fresh water and saline (salt) water along the length of the (injection or observation) well.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DETAILED DESCRIPTION OF THE PREFERRED EMBODIMENT

This specification is divided into two parts: (1) a first part which discloses a first concept called "Seawater Barrier Monitoring", and (2) a second part which discloses a second related concept called "Water Aquifer Electrical Monitoring Electrode cable System".

Seawater Barrier Monitoring

Figure 1:
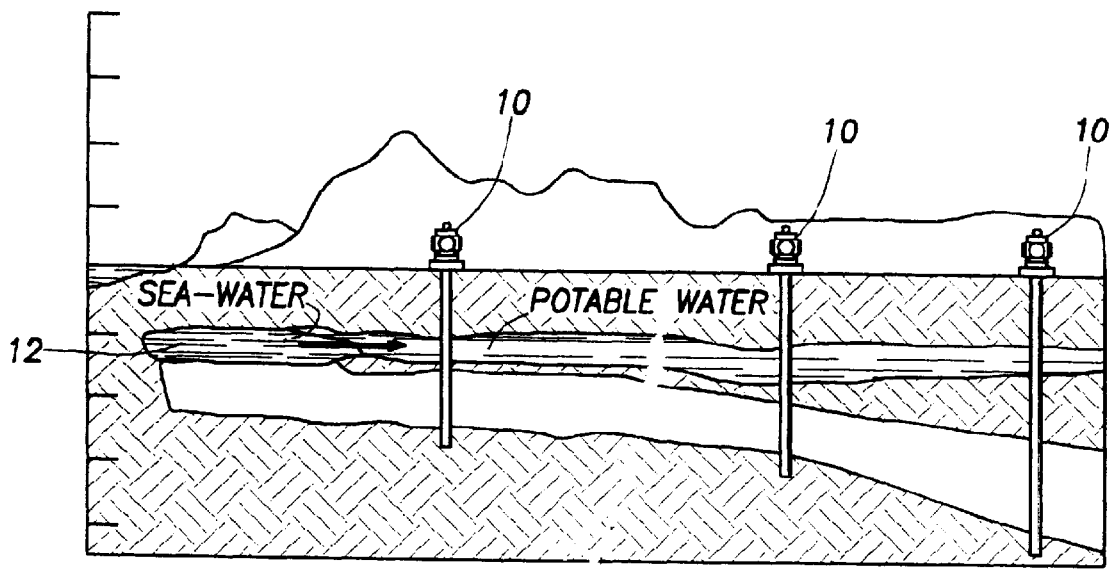
FIG. 1 illustrates seawater intrusion into a potable groundwater aquifer.

Referring to FIG. 1, coastal cities rely on groundwater from subsurface aquifers to meet all or part of their municipal water needs. In cases of historical overdraft, water is withdrawn from the subsurface aquifer(s) at a rate exceeding the rate of natural aquifer recharge. As illustrated in FIG. 1, such overdraft results in a lowering of the water table in the aquifer(s), and is accompanied by possible intrusion of seawater 12 into the aquifer. The breakthrough of seawater 12 at wells 10 supplying drinking water has severe long-term consequences on municipal potable water deliverability. For example, Los Angeles (LA) experienced such overdraft in the first half of the 1900's. As a result, LA subsequently created the Water Replenishment District (WRD) agency to define and enforce reduced aquifer pumping rates and mitigate the effects of seawater intrusion.

Figure 2:
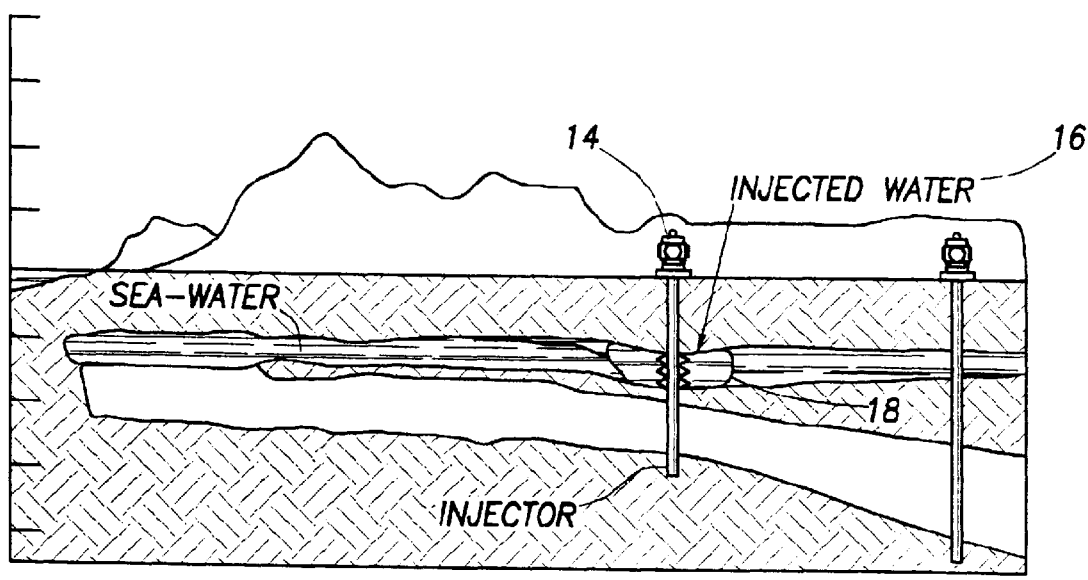
FIG. 2 illustrates water injection to mitigate seawater advance into a potable aquifer.

Referring to FIG. 2, various means exist to mitigate seawater advance. One of these methods is to recharge the aquifers from surface spreading grounds. Another is to inject inert gas or fresh water with special injection wells 14, as illustrated in FIG. 2. The water injection method consists of injecting fresh water 16 into the aquifer, forming a fresh water "mound" 18 in a local area around the well, thereby creating a zone having a pressure which is above the pressure in the seawater and therefore mitigating the landward advance of the seawater.

Figure 3:
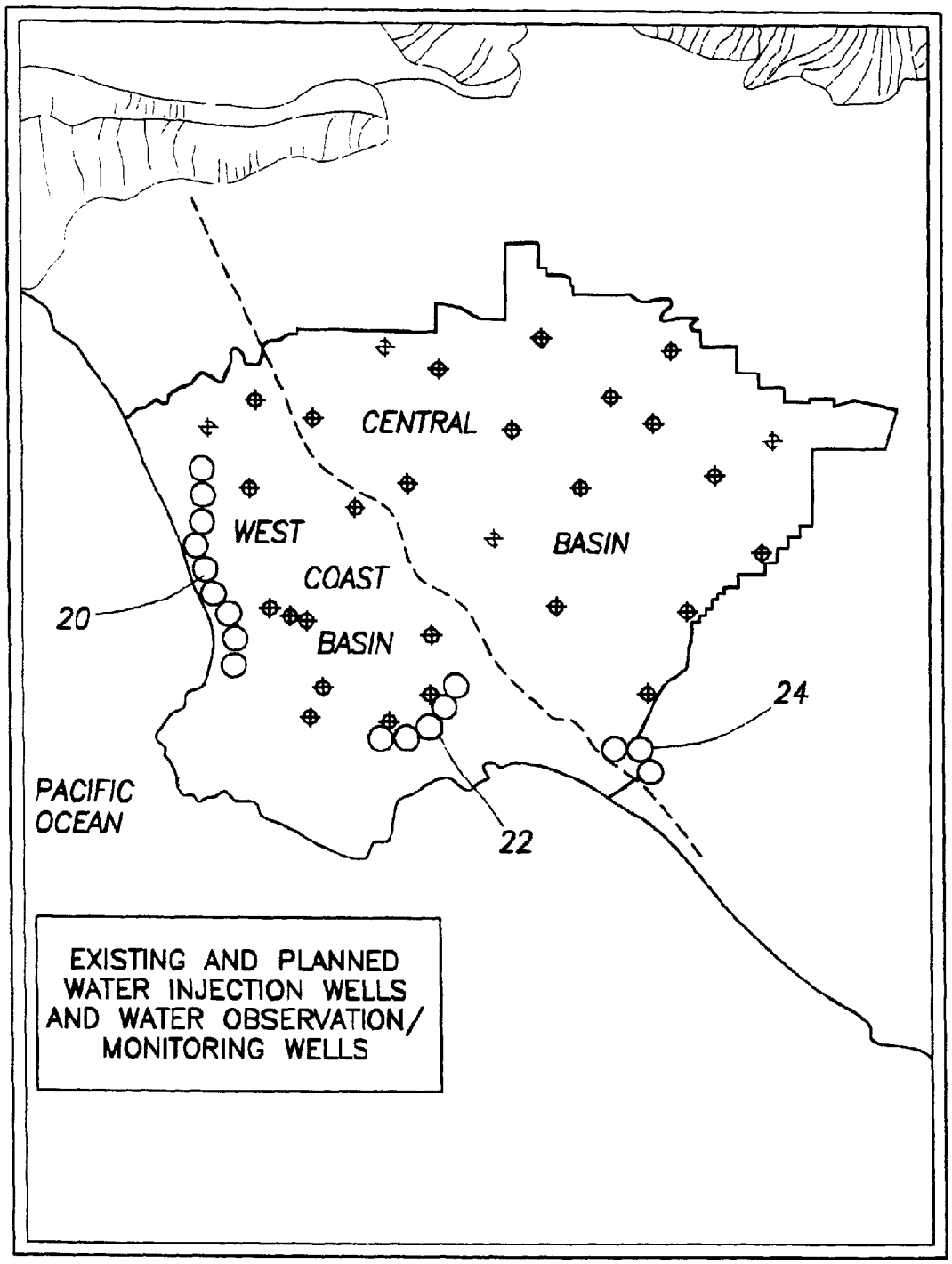
FIG. 3 illustrates three lines of water injectors in the Los Angeles basin to inject fresh water and for monitoring the resulting a seawater barrier to restrict the landward advance of subsurface seawater into potable aquifers.

Referring to FIG. 3, as an example, since the 1950s, Los Angeles has constructed approximately 250 seawater barrier injection wells 14 of this type in three lines of injectors. These three lines of injection wells are illustrated in FIG. 3 by element numerals 20, 22, and 24, where the position of the water injection wells along each line of injectors 20, 22, and 24 is shown in FIG. 3 by the interconnected circles.

In addition to the wells constructed for water injection, a number of observation or monitoring wells (hereinafter, 'observation/monitoring wells') are typically constructed in the vicinity of the injection wells. These 'observation/monitoring wells' are used to periodically measure the pressure (hydraulic head) of the aquifer in the neighborhood of the injection wells, and for occasional sampling of water chloride (salinity) levels. This gives information about how efficiently the injectors (i.e., the injection wells) are limiting the seawater advance. In Los Angeles, over 700

'observation/monitoring wells' have been constructed along the three lines of injection wells (20, 22, and 24 in FIG. 3) to monitor the position of the seawater wedge.

Figure 4:
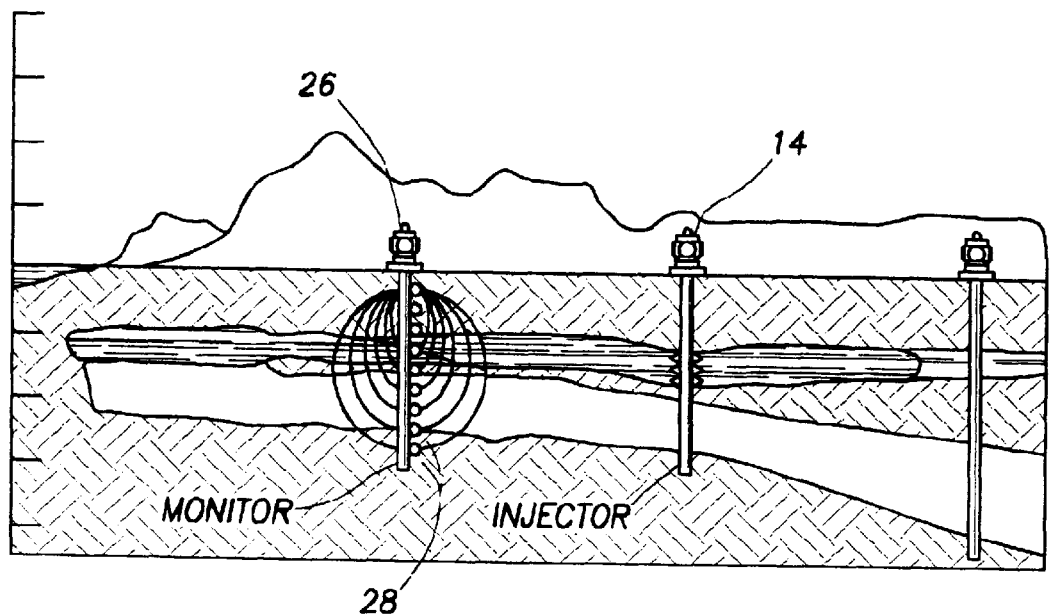
FIG. 4 illustrates monitoring the seawater position with an electrical resistivity array buried in the subsurface.
Figure 9:
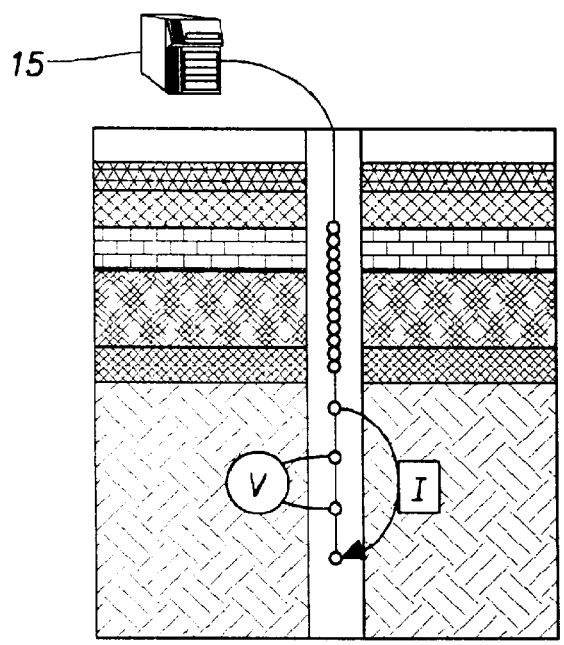
FIG. 9 illustrates how a basic resistivity 4-electrode (quadrapole) measurement flows electrical current I between the outer two electrodes and measures the voltage potential V between the inner pair of electrodes, where the resistivity in the vicinity of the four electrodes is computed from I and V.

Referring to FIGS. 2, 4 and 9, in accordance with a first aspect of the present invention, a plurality of 'permanently installed aquifer sensors' are permanently placed in the ground near both the 'observation/monitoring wells' and the injection wells in order to passively and continuously monitor: (1) the status of the advance of the seawater toward the fresh water aquifers located near coastal cities, and (2) the status of the injected fresh water when the fresh water is injected into the ground in the manner illustrated in FIG. 2. Such 'permanently installed aquifer sensors' would be installed in the ground (i.e., in the earth formation). Such sensors would be electrically connected to surface acquisition equipment, in the manner illustrated in FIGS. 4 and 9, that would, without human intervention, transmit the acquired data to a centralized facility for processing and interpretation. FIG. 9 shows the cable to the wellsite acquisition electronics box 15. This box 15 is, in turn, connected to a data telemetry system (not shown) which transmits the data to a centralized facility. This would avoid the process of manual data collection and provide more frequent and timely data for better control of water injection.

Depending on the application, in connection with the 'permanently installed aquifer sensors', various types of in-situ sensors may be employed. One appropriate technology is electrical resistivity arrays that would be used to monitor the subsurface electrical resistivity in the vicinity of the monitoring array. Such devices have been proposed for general reservoir monitoring [refer to: Babour, K. A., Belani and J. Pilla, 'Method and Apparatus for Surveying and Monitoring a Reservoir Penetrated by a Well Including Fixing Electrodes Hydraulically Isolated within a Well', U.S. Pat. No. 5,642,051, the disclosure of which has been incorporated by reference into this specification] and for leak detection, soil heating and temperature mapping [refer to: (1) Berryman, James G., Daily, William D., 'Optimal joule heating of the subsurface, U.S. Pat. No. 5,325,918, (2) Daily, William D., Laine, Daren L., Laine, Edwin F., 'Methods for Detecting and Locating Leaks in Containment Facilities using Electrical Potential Data and Electrical Resistance Tomographic Imaging Techniques', U.S. Pat. No. 5,661,406, and (3) Ramirez, Abelardo L.; Dwayne A.; Daily, William D., 'Using Electrical Resistance Tomography to Map Subsurface Temperatures', U.S. Pat. No. 5,346,307, the disclosures of which have been incorporated by reference into this specification].

Referring to FIG. 4, an observation/monitoring well 26 is illustrated, the observation/monitoring well 26 being equipped with a permanently installed resistivity array 28. The resistivity array 28 is described in the "Babour" reference cited above, the Babour reference being disclosed in U.S. Pat. No. 5,642,051. The resistivity array 28 in FIG. 4 includes the 'permanently installed aquifer sensors' mentioned above, such 'permanently installed aquifer sensors' comprising a plurality of 'electrically conductive electrodes' (i.e., a plurality of the 'permanently installed aquifer sensors'). In operation, during the measurement process, electrical current is injected into the earth using one or more of the 'electrically conductive electrodes' (which comprise the resistivity array 28 shown in FIG. 4) and electrical voltage potentials are measured using the other remaining 'electrically conductive electrodes'. A plurality of 'measured data' is collected during the measurement. The set of all such 'measured data' then undergoes computer processing in order to estimate and produce a 'plurality of values' which represent values of electrical conductivity (or its inverse, resistivity) which exist at several positions or locations in the earth formation along the length of the resistivity array 28 in FIG. 4.

Figure 5:
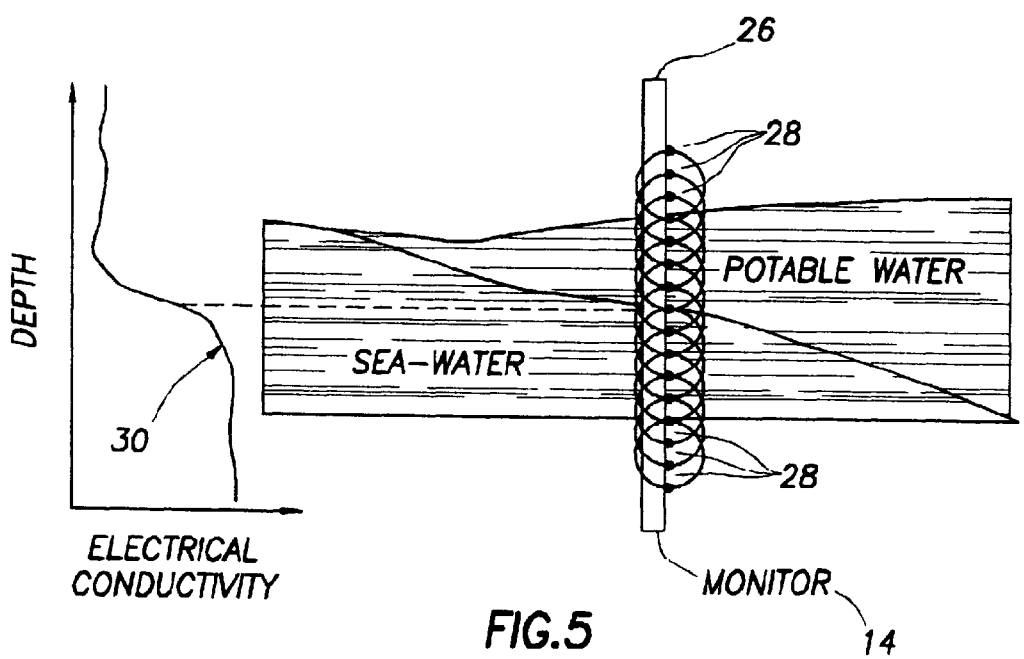
FIG. 5 illustrates an electrical conductivity (curve at left) measured with an in-situ resistivity array indicating the vertical position of the interface between the seawater and potable water.

Referring to FIG. 5, refer now to the curve 30 located at the left side of FIG. 5. The curve 30 represents the aforementioned 'plurality of values' which further represent values of 'electrical conductivity' (or 'resistivity') which exists at the several locations in the formation along the length of the resistivity array 28 in FIGS. 4 and 5. The value of 'electrical conductivity' at each position along the resistivity array 28 may then be related to the earth rock and fluid properties at each location along the length of the array 28. In particular, the aforementioned 'electrical conductivity' information may be used to distinguish between: (1) briny, electrically conductive seawater zones, from (2) potable, electrically more resistive freshwater zones. With the resistivity array 28 in FIG. 5, the position of the boundary or contact between the seawater zone and the freshwater zone may be estimated by determining the vertical position of the transition between high and low conductivity values and monitored in time thereby providing: (1) improved knowledge of the state of the seawater advance toward fresh water aquifers near coastal cities, and (2) better mitigation of the advance of such seawater into the potable water (i.e., fresh water) aquifers.

In FIG. 5, in accordance with another implementation of the present invention, the resistivity array 28 may be lowered down into the inside of a dedicated observation/monitoring well 26. The interface between the seawater and potable water shown in FIG. 5 is also present on the interior of the 'observation/monitoring well' 26. A resistivity array 28 installed on the inside of the observation well may similarly be used to infer the presence and position of the seawater wedge from electrical voltage-current measurements. If configured with a long interval of coverage, a resistivity array 28 may also be used to detect the presence of (or the absence of) water at each depth along the array 28, providing an indictor of hydraulic head (i.e., free water level) in the well and its variation with time.

Water Aquifer Electrical Monitoring Electrode Cable System

Figure 6:
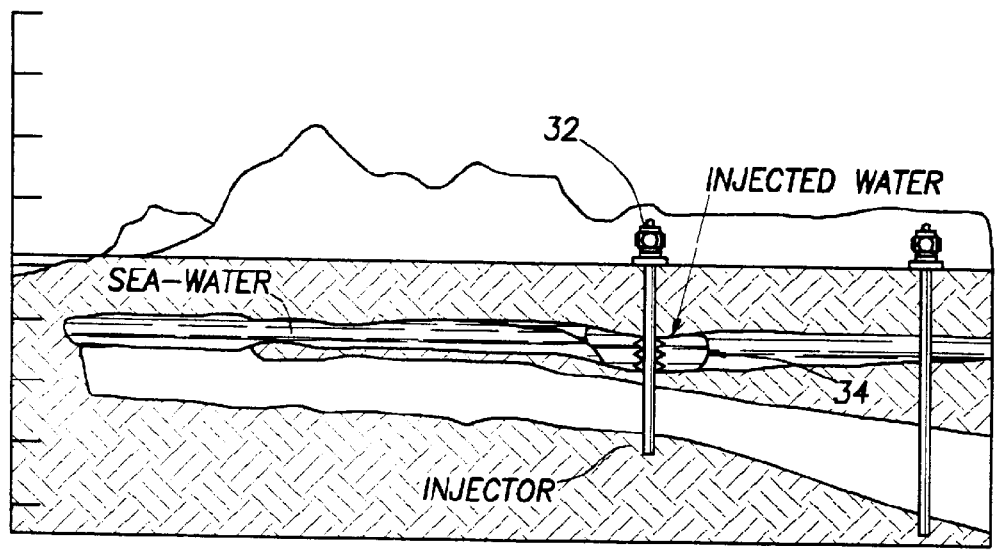
FIG. 6, which is identical to FIG. 2, also illustrates water injection to mitigate seawater advance into a potable aquifer.

Referring to FIGS. 2 and 6, recall again that coastal cities rely on groundwater from subsurface aquifers to meet all or part of their municipal water needs. In cases of historical overdraft, water is withdrawn from the subsurface aquifer(s) at a rate exceeding the rate of natural aquifer recharge. Such overdraft results in a lowering of the water table in the aquifer(s), and is accompanied by possible intrusion of seawater into the aquifer. The breakthrough of seawater at wells supplying drinking water has severe longterm consequences on municipal potable water deliverability. Various means exist to mitigate seawater advance. One of these methods is to inject fresh water into the aquifer using special-purpose injection wells 32, as illustrated in FIG. 6 (or injection well 14 in FIG. 2). The water injection method consists of injecting fresh water into the aquifer, forming a region 34 in FIG. 6 (region 16 in FIG. 2) of high fresh water pressure around the well, mitigating the landward advance of the seawater.

Figure 7:
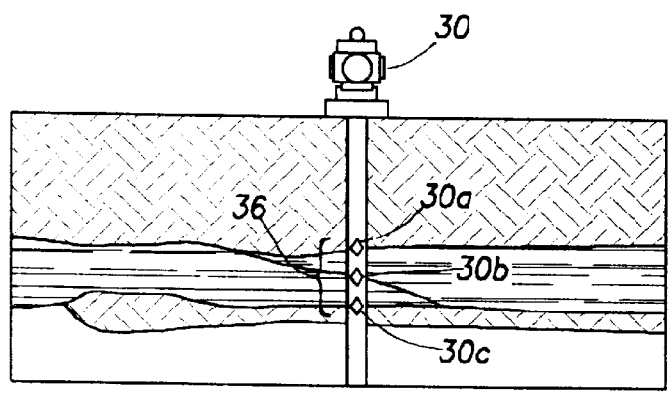
FIG. 7 illustrates how municipal authorities measure chloride concentrations in observation wells at the top, middle, and bottom of each water sand.

Referring to FIG. 7, in the prior art, in addition to the injection wells 32 constructed for water injection, a number of observation/monitoring wells 30 are typically constructed in the vicinity of the injection wells 32. These observation wells 30 are used to periodically measure the pressure (hydraulic head) of the aquifer in the neighborhood of the injectors 32, and for occasional sampling of water chloride (salinity) levels. In FIG. 7, assume now that one or more 'water sand units' 36 exist along and adjacent to each observation/monitoring well 30. In FIG. 7, in a typical municipal (city) setting, when seawater is advancing and moving into the fresh water aquifers, the city water authorities perform the following 'technique': (1) lowering a wireline conductivity cell into the center of an observation/ monitoring well 30, and (2) taking measurements at three (3) depths by sampling the chloride concentrations at three positions along each 'water sand unit' 36 disposed adjacent to each observation well 30. That is, in FIG. 7, the measurements are taken at a top position 30a, a middle position 30b, and a bottom position 30c. The aforementioned 'technique' provides information about how efficiently the injectors (i.e., the injection wells 32) are limiting the seawater advance into each 'water sand unit' 36. However, in FIG. 7, in the prior art, there were no permanent arrays (e.g., a resistivity arrays) disposed inside or outside the casing of the 'observation/monitoring wells' 30.

In the "Seawater Barrier Monitoring" section of this specification set forth above, in accordance with one aspect of the present invention, certain types of sensors (such as resistivity array 28 in FIG. 4) are permanently placed in the ground around or inside observation/monitoring wells 14 in order to passively and continuously monitor the status of: (1) the seawater advance into fresh water aquifers near coastal cities, and (2) fresh drinking water. Such sensors would be installed in the ground outside the casing or be appropriately suspended in the interior of the observation wells 14. The sensor array (resistivity array) 28 would be electrically connected to surface acquisition equipment that would, without human intervention, transmit the acquired data to a centralized facility for processing and interpretation. This would avoid the process of manual data collection and provide more frequent and timely data for better control of water injection.

Figure 7A:
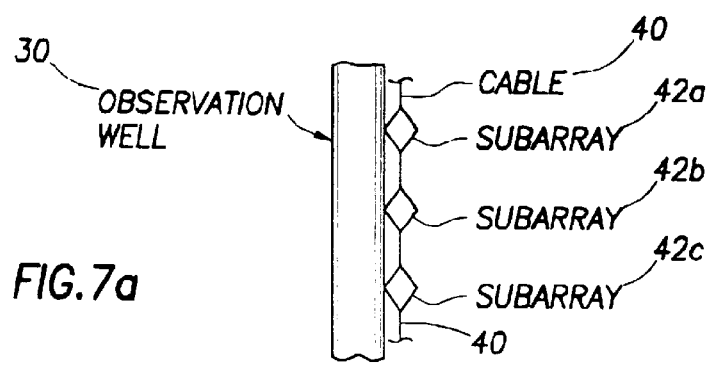
FIG. 7a illustrates a resistivity array including a plurality of subarrays located outside the casing of an observation well.

Referring to FIG. 7a, in accordance with another aspect of the present invention, an observation well 30 includes a casing, and a permanent array (e.g., a resistivity array) is disposed outside the casing of the monitoring/observation well 30. More particularly, the permanent array comprises a multi-conductor cable 40. The multi-conductor cable 40, which is an example of a resistivity array, is attached to the exterior of a casing of the monitoring/observation well 30. The multi-conductor cable/resistivity array 40 includes a plurality of electrical conductivity measurement 42a, 42b, and 42c (where each electrical conductivity measurement 42a, 42b, 42c comprises a subarray of the full array 28 in FIG. 4; the subarray will be discussed later in this specification). The cable 40 and the plurality of electrical conductivity measurements 42a, 42b, and 42c collectively comprise an example of the resistivity array 28 of FIG. 4 and 5. The multi-conductor cable/resistivity array 40 in FIG. 7a disposed along the exterior of the observation well 30 casing would monitor the subsurface electrical resistivity in the vicinity of the resistivity array 28 in FIG. 4. Since the electrical resistivity of the fresh aquifer water is much higher than the resistivity of saline (salty) seawater, the electrical contrast in resistivity between seawater and fresh water is large. Therefore, bearing in mind that a 'water sand unit' having a top part 30a, a middle part 30b, and a bottom part 30c in FIG. 7 is disposed adjacent the above referenced electrical conductivity measurements 42a, 42b, and 42c of FIG. 7a, the electrical conductivity measurements 42a–42c made at the top part 42a, the middle part 42b, and the bottom part 42c of each 'water sand unit' should be capable of distinguishing between saline (salty) seawater and fresh aquifer water at each level. Further, electrical measurements made (by the resistivity array 28) along an entire interval located inside an observation/monitoring well 30 should also be capable of distinguishing fresh aquifer water (which has a high resistivity) from air (which has an infinite resistivity) at each level, thereby providing a continuous remote-reading indication of the free water level inside the observation well 30 of FIG. 7a.

Referring to FIG. 9, after the resistivity array cable 40 of FIG. 7a is installed in the earth along the exterior of the well casing of observation well 30 or inside the observation well 30, time-lapse in-situ electrical resistivity measurements are carried out. Each "electrical conductivity measurement" (that is, each 'subarray') comprises a 'plurality of electrodes', and that 'plurality of electrodes' further comprises a set of 4 electrodes called a 'quadrupole'. The basic 'quadrupole' measurement, illustrated in FIG. 9, consists of: (1) injecting and withdrawing electrical current 'I' between the outer two electrodes of the group of four, and measuring the voltage potential 'V' between the two inner electrodes. The resistivity of the earth formation in the vicinity of the quadrupole is computed from knowledge of 'I' and 'V'.

Figure 8:
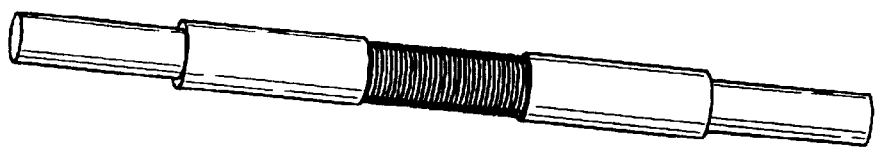
FIG. 8 illustrates a resistivity array flatpack cable with an integrally constructed passive electrode formed as a coil of wire and overmolded on its ends.

Referring to FIG. 8, the multi-conductor cable 40 of FIG. 7a including the electrodes 28 of FIG. 5 is illustrated. When using the aforementioned technique previously discussed regarding the installation of electrical resistivity arrays in subsurface reservoirs, an electrical cable (such as cable 40 of FIG. 7a) is placed on the exterior of the well casing (of the observation/monitoring well 30 of FIG. 7a) or tubing to position an array of resistivity electrodes (such as subarrays 42a, 42b, and 42c of FIG. 7a) in direct contact with the earth. A similar deployment may be used inside the well. FIG. 8 shows a short section of the electrical cable 40. It is a multi-conductor cable, and, at selected points along the cable, 'individual conductors' of the cable are pulled out of a bundle of conductors, and an 'individual conductor' is attached to an 'electrode' (such as electrode 28 in FIG. 5) as shown in FIG. 8. The 'electrode' is formed by manually opening the cable exterior jacket, fishing out one of the internal conductors, winding a coil of plated wire around the exterior of the cable, welding the external coil to the internal conductor, and overmolding the coil ends with rubber to establish a hydraulic seal. In this approach, an array of "N" electrodes distributed along the cable requires "N" such manual interventions.

Figure 10:
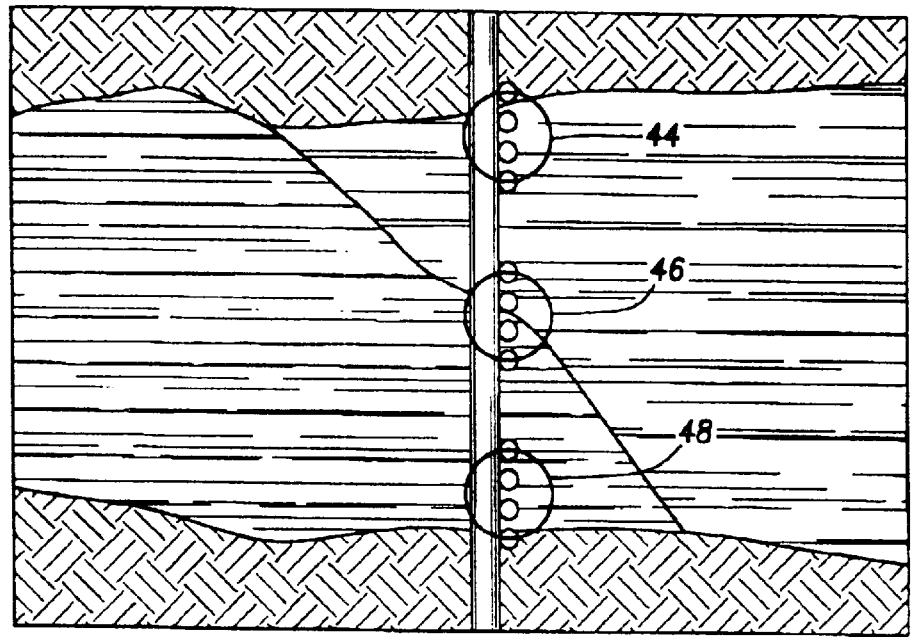
FIG. 10 illustrates three quadrapole subarrays for measuring the resistivity at the top, middle, and bottom of water bearing sand.

Referring to FIG. 10, by deploying a resistivity array (such as resistivity array 28 in FIG. 5 or subarrays 42a, 42b, and 42c of FIG. 7a or the resistivity array shown in FIG. 9) along the inside or outside of a casing of an observation/ monitoring well 30 situated in a water aquifer, the electrode quadrupoles (such as the quadrupoles shown in FIG. 9) may be used to obtain resistivity measurements at one or more depths in the water bearing sands. As just described, each quadrupole is capable of a single formation or water resistivity measurement, and this, in turn, may be used to discriminate fresh water from saline water along the length of the well. Thus, in order to obtain three independent samples of resistivity at the top 30a, middle 30b, and bottom 30c of a 'water sand unit', for example, as illustrated in FIG. 7, a series of three electrode quadrupole subarrays 44, 46, and 48 illustrated in FIG. 10 would be necessary, where each quadrupole subarray includes 4 electrodes and where the three electrode quadrupole subarrays have a total of 12 electrodes. The fabrication of twelve electrodes requires twelve manual operations of opening the cable jacket and manually winding each of the electrode elements. Fabrication of twelve electrodes will likely raise the total cable array cost to an unacceptably high level for the water industry, especially if more than one sand unit is to be monitored in this way.

Figures 11A, 11B:
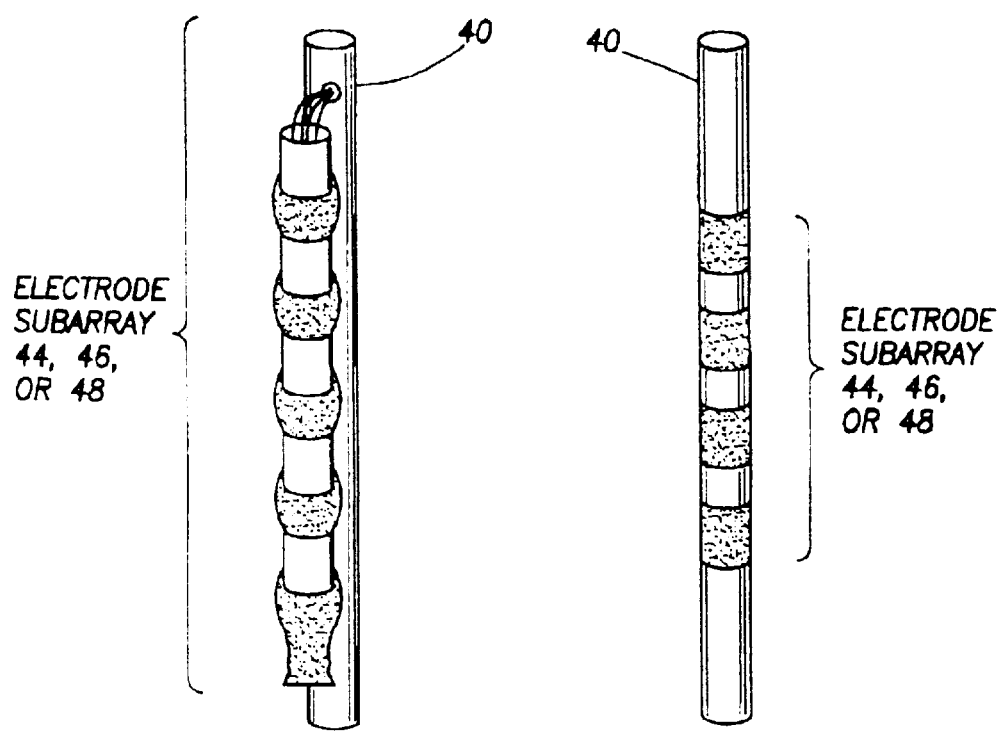
FIGS. 11a and 11b illustrate modular quadrapole subarrays for measuring resistivity, where (a) on the left shows a modular assembly prefabricated and attached to the cable with one manual intervention, and (b) on the right shows solid metal electrodes wrapped around the cable and attached into the cable with four manual interventions.

Referring to FIGS. 11a and 11b, in accordance with another aspect of the present invention, in order to reduce the total cost to fabricate subarrays of quadrupole electrodes on a cable, it is proposed that each quadrupole subarray of four electrodes, such as quadrapole subarray 44 or 46 or 48 in FIG. 10, be manufactured as a single integral assembly, and that each four-electrode quadrupole subarray be connected into the cable in a single manual operation. This would allow three quadrupole subarrays (the number necessary to sample the top 30a, middle 30b, and bottom 30c of a water sand unit) to be fabricated with only three manual interventions as opposed to twelve manual interventions, reducing total array fabrication cost. Each quadrupole subarray assembly 44 or 46 or 48 may be, for example, a distinct unit, as shown in FIG. 11a, made out of an insulating material like plastic or ceramic with integral electrodes. Alternatively, each quadrupole subarray assembly 44 or 46 or 48 may be a set of solid plated metal electrodes wrapped around the cable (of FIG. 8) as shown in FIG. 11b. In the case of FIG. 11a, the wires attached to the four electrodes comprising each quadrupole subarray 44 or 46 or 48 enter the cable jacket at one entry point via a single manual intervention. In the case of FIG. 11b, the four wires attached to the four electrodes enter the cable jacket at four locations, thereby requiring four manual interventions.

Figure 12A:
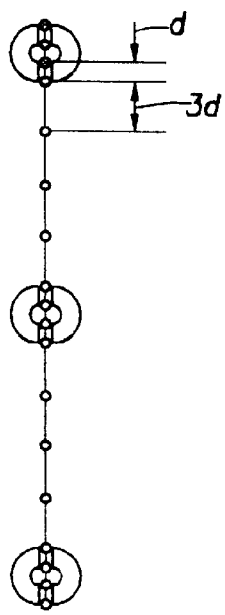
FIGS. 12a, 12b, 12c, and 12d illustrate multiple-scale resistivity measurements using sets of non-uniformly spaced electrodes.
Figure 12B:
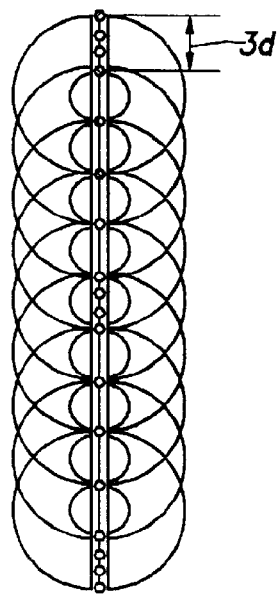
Figure 12C:
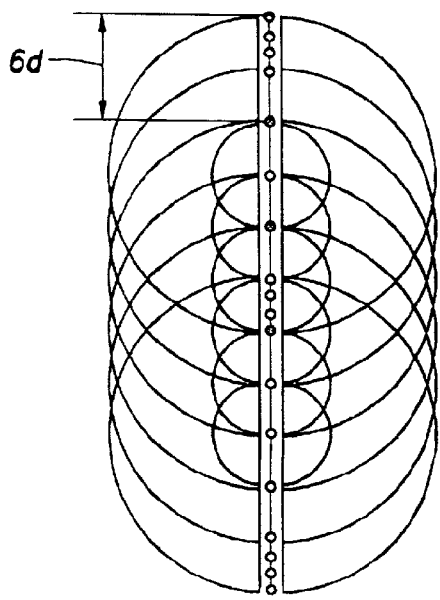
Figure 12D:
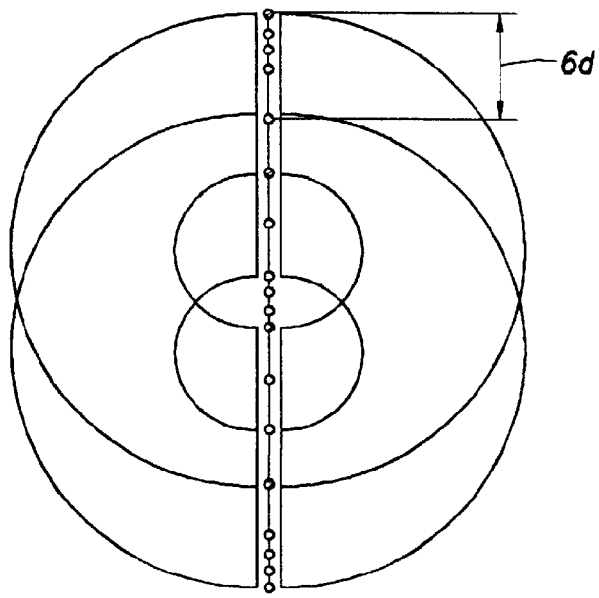

Referring to FIGS. 12a, 12b, 12c, and 12d, in accordance with still another aspect of the present invention, by combining quadrupole subarrays fabricated in this way (i.e., the quadrupole subarrays discussed above with reference to FIG. 11b) with single electrodes along the cable, it would be possible to create a "Multi-Resolution" electrical array. One example is illustrated in FIGS. 12a through 12d. As shown in FIG. 12a, the basic quadrupole is fabricated with an inter-electrode spacing "d". This might be, for example, in the order of inches for a compact quadrupole resistivity measurement. Then, as illustrated in FIG. 12b, 4 electrodes at spacing "3d" may be used to make a lower-resolution quadrupole measurement. By virtue of the longer inter-electrode spacing, this quadrupole measurement would be sensitive to resistivity variations in a somewhat larger zone around the quadrupole, as indicated pictorially by the larger diameter circles in FIG. 12b compared to FIG. 12a. In a similar way, electrodes at spacings of "6d" and "9d" may be used as shown in FIGS. 12c and 12d to measure the resistivity in even larger zones around the array, each at correspondingly lower vertical resolution.

Figure 13:
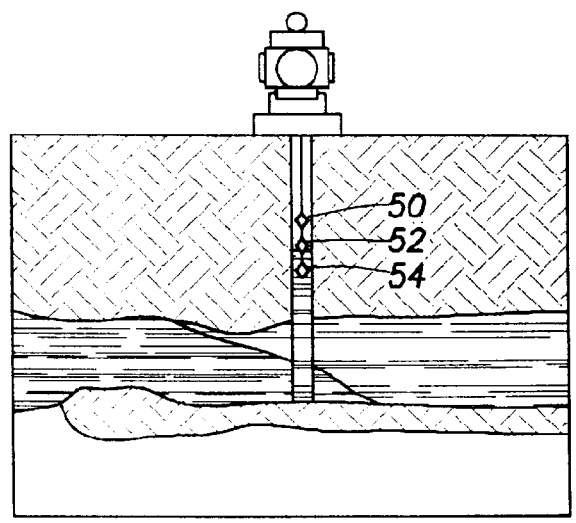
FIG. 13 illustrates isolated electrodes for monitoring the 'head' or free water level inside the well casing to within the separation of two electrodes.

Referring to FIG. 13, in accordance with still another aspect of the present invention, in connection with a concept called "head monitoring/calibration", an additional concept includes the addition of one or several isolated additional electrodes in order to monitor the free water level inside an observation/monitoring well, as illustrated in FIG. 13. Here, individual electrodes may be used as follows: to determine the approximate level of 'head' in the well by distinguishing whether each electrode is in a water or air environment. Another way such a measurement may be used is as follows: to continuously monitor an electrode as the free water level is varying over a time scale of days to weeks to months. The moment the water level traverses the monitored electrode, the free head level is known precisely, through knowledge of the electrode depth in the well. This information (precise knowledge of 'head' at one time in a well) may then be used to periodically recalibrate an in-situ permanent pressure gauge in the same well, correcting the gauge for long-term drift that is prevalent in low-cost pressure gauges.

Finally, another implementation is as follows: to use two or three electrodes 50, 52, and 54, as shown in FIG. 13, as high and low-level "event detectors". In salt water barrier applications, it is desired to maintain the 'head' or pressure distribution near some nominal distribution across the aquifer. In any one well, that corresponds to a "set point" of pressure needed to maintain control in retarding advance of the sea water wedge. By placing two or three electrodes in the well at appropriate depths, the electrode system can function as a continuous alarm system, alerting the user that the water level has: (1) fallen too low, so that injection is needed, or (2) has risen too high, so that injection may be terminated. In this way, a feedback system may be set up to control water injection and the free water level distribution in the aquifer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of passively and continuously monitoring a status of seawater advance toward fresh water aquifers which are located adjacent coastal cities, one or more observation wells being located in the fresh water aquifers adjacent said coastal cities, comprising the steps of:
   installing sensors in or around said observation wells,
   using said sensors, monitoring the advance of said seawater toward said fresh water aquifers.

2. The method of claim 1, wherein said one or more observation wells are located adjacent one or more injection wells, and wherein said sensors associated with said observation wells detect said advance of said seawater toward said fresh water aquifers and further detect a pressure in a mound of fresh water that has been injected into said injection wells, said pressure in said mound being above a pressure in said seawater for mitigating a landward advance of said seawater toward said fresh water aquifers.

3. The method of claim 1, wherein said sensors associated with said observation wells comprise a resistivity array located within or around a casing of said observation wells adapted for measuring a conductivity and a resistivity of an earth formation within or around said observation wells, said conductivity and resistivity being representative of a presence or absence of either seawater or fresh water within or around said observation wells and being further representative of a location of a seawater/fresh water boundary within or around said observation wells, said boundary being further representative of an advance of seawater toward fresh water aquifers located adjacent coastal cities.

4. The method of claim 3, wherein each said resistivity array is located around said casing of said observation wells and adjacent a water sand unit of said earth formation, said resistivity array comprising a top subarray portion, a middle subarray portion, and a bottom subarray portion for measuring and determining the conductivity and resistivity of a top part, a middle part, and a bottom part of said water sand unit thereby determining said location of said seawater/fresh water boundary.

5. The method of claim 4, wherein said top subarray portion, said middle subarray portion, and said bottom subarray portion of said resistivity array each comprise a plurality of electrodes, the plurality of electrodes of the top subarray portion, said middle subarray portion, and said bottom subarray portion being located adjacent, respectively, the top part, the middle part, and the bottom part of the water sand unit.

6. The method of claim 5, wherein each said subarray portion comprises a plurality of electrodes, a first pair of the electrodes generating and receiving current, a second pair of the electrodes generating a potential difference, the current and the potential difference being used to determine a resistivity of said water sand unit, said resistivity being indicative of a presence or absence of seawater in the water sand unit adjacent said observation well.

7. The method of claim 6, wherein each of the electrodes, which comprise said each said subarray portion of said resistivity array, are spaced apart from an adjacent electrode by a distance, said distance being chosen such that a particular resolution is achieved, a distance "d" between electrodes achieving one resolution, a distance "3d" achieving another resolution, and distances "6d" and "9d" achieving still other resolutions.

8. The method of claim 6, wherein said each said subarray portion comprises a distinct unit comprised of an insulating material having interleaved integral electrodes.

9. The method of claim 6, wherein said each said subarray portion comprises a set of solid plated metal electrodes wrapped around a cable.

10. The method of claim 3, further comprising the step of:
further installing a plurality of isolated additional electrodes within or around the observation well, in combination with said resistivity array located within or around said observation well, for monitoring a free water level within said observation well.

11. The method of claim 4, wherein each said subarray portion, that is located adjacent said top part and said middle part and said bottom part of said water sand unit, comprises a quadrupole subarray electrode set, said electrode set further including a plurality of quadrupole subarray electrodes, one quadrupole subarray electrode being located adjacent said top part of said water sand unit, another said quadrupole subarray electrode being located adjacent said middle part of said water sand unit, and still another said quadrupole subarray electrode being located adjacent said bottom part of said water sand unit.

12. A method of monitoring an advance of seawater toward a fresh water aquifer, an observation well penetrating said fresh water aquifer, said observation well having a casing, comprising the steps of:
locating a resistivity array within or around said casing of said observation well, an aquifer being located around said resistivity array;
using said resistivity array, measuring a resistivity value or a conductivity value of a water based substance in said aquifer around said resistivity array, the values of said resistivity or conductivity being representative of a presence or an absence of either seawater or fresh water in said water based substance in said aquifer.

13. The method of claim 12, wherein said water based substance in said aquifer around said resistivity array includes a top part, a middle part, and a bottom part, said resistivity array includes a top subarray, a middle subarray, and a bottom subarray, and wherein the measuring step further comprises the steps of:
using the top subarray of the resistivity array, taking measurements to obtain a first resistivity value or a first conductivity value of the top part of said water based substance in said aquifer around said resistivity array,
using the middle subarray of the resistivity array, taking measurements to obtain a second resistivity value or a second conductivity value of the middle part of said water based substance in said aquifer around said resistivity array, and
using the bottom subarray of the resistivity array, taking measurements to obtain a third resistivity value or a third conductivity value of the bottom part of said water based substance in said aquifer around said resistivity array.

14. The method of claim 13, wherein a seawater/fresh water boundary is located in said top part, said middle part, and said bottom part of said water based substance in said aquifer, the first resistivity value or conductivity value, the second resistivity value or conductivity value, and the third resistivity value or conductivity value being used to determine a location of said seawater/fresh water boundary in said water based substance in said aquifer.

15. The method of claim 14, wherein each subarray includes a quadrupole electrode set, said quadrupole electrode set including a plurality of electrodes, the step of taking measurements by each subarray to obtain a resistivity value or a conductivity value of the top, middle, and bottom part of said water based substance in said aquifer comprising the steps of:
injecting current into said water based substance in said aquifer from a first electrode of the plurality of electrodes,
receiving current from said aquifer into a second electrode of the plurality of electrodes, and
measuring a potential difference using a third and fourth electrode of the plurality of electrodes,
said potential difference being representative of said resistivity value or said conductivity value of said water based substance in said aquifer,
said resistivity value or conductivity value of said water based substance in said aquifer being further representative of a presence or absence of seawater in said water based substance in said aquifer.

16. The method of claim 15, wherein the electrodes of said quadrupole electrode set are spaced apart by a distance, said distance being chosen such that a particular resolution is obtained.

17. A method of using an observation well which penetrates a water aquifer in an earth formation that is located near coastal cities to measure and obtain data representative of a characteristic of the water in said aquifer, said observation well having water disposed therein, comprising the steps of:
(a) locating an electrode inside said observation well, a depth of said electrode in said observation well being known;
(b) using said electrode, determining when a level of said water in said observation well traverses said electrode thereby determining a free head level of said water in said observation well through knowledge of said depth of said electrode in said observation well;
(c) locating a resistivity array within or around a casing of said observation well, said casing being disposed within said water aquifer in said earth formation; and
(d) using said resistivity array, determining a resistivity of a water based substance disposed around said casing within said aquifer, said resistivity being representative of a presence or absence of seawater in said aquifer and being determinative of any advance of said seawater into said aquifer.

18. The method of claim 17, wherein said resistivity array comprises a plurality of subarrays including a top subarray, a middle subarray, and a bottom subarray, said water based substance around said casing within said aquifer including a top part disposed adjacent said top subarray, a middle part disposed adjacent said middle subarray, and a bottom part disposed adjacent said bottom subarray.

19. The method of claim 18, wherein the determining step (d) for determining said resistivity of said water based substance disposed around said casing within said aquifer comprises the steps of:

(d1) using said top subarray, determining a resistivity of the top part of said water based substance around said casing within said aquifer;

(d2) using said middle subarray, determining a resistivity of the middle part of said water based substance around said casing within said aquifer; and (d3) using said bottom subarray, determining a resistivity of the bottom part of said water based substance around said casing within said aquifer.

20. The method of claim 19, wherein said top subarray, said middle subarray, and said bottom subarray each comprise an electrode set including a plurality of electrodes, the determining steps (d1), (d2), and (d3) each comprising the steps of:

using a first electrode of said plurality of electrodes, injecting a current into said water based substance around said casing within said aquifer;

using a second electrode of said plurality of electrodes, receiving said current from said aquifer; and using a third and fourth electrode of said plurality of electrodes, measuring and determining a potential difference which exists between the third and fourth electrodes, said potential difference being representative of said resistivity of the top, middle, and bottom parts of the water based substance around said casing within said aquifer, said resistivity in the top, middle, and bottom parts of the water based substance within said aquifer being further representative of the presence or absence of said seawater in said aquifer and any advance of said seawater into said aquifer.

* * * * *